Nov. 30, 1937.  W. MARSHALL  2,100,812
TRIM PANEL ASSEMBLY
Original Filed Sept. 29, 1933
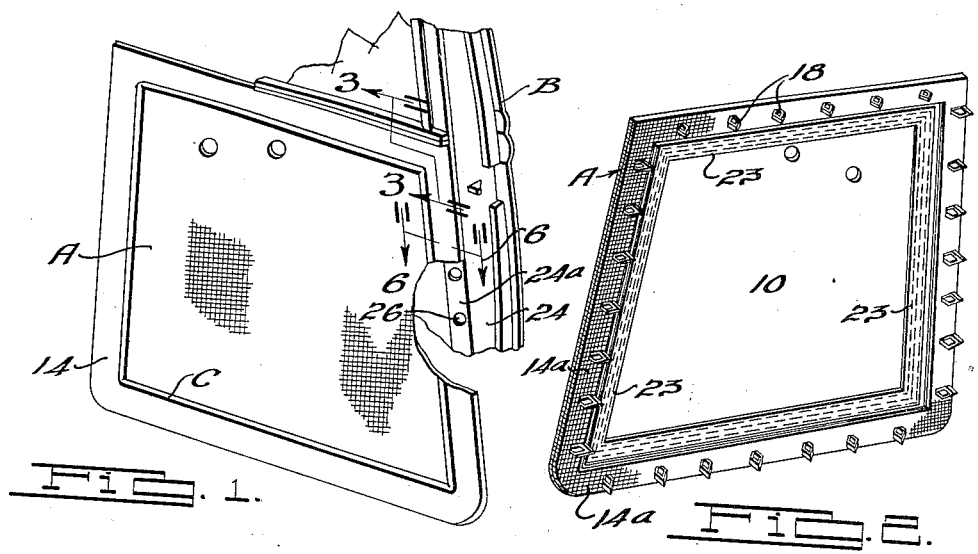
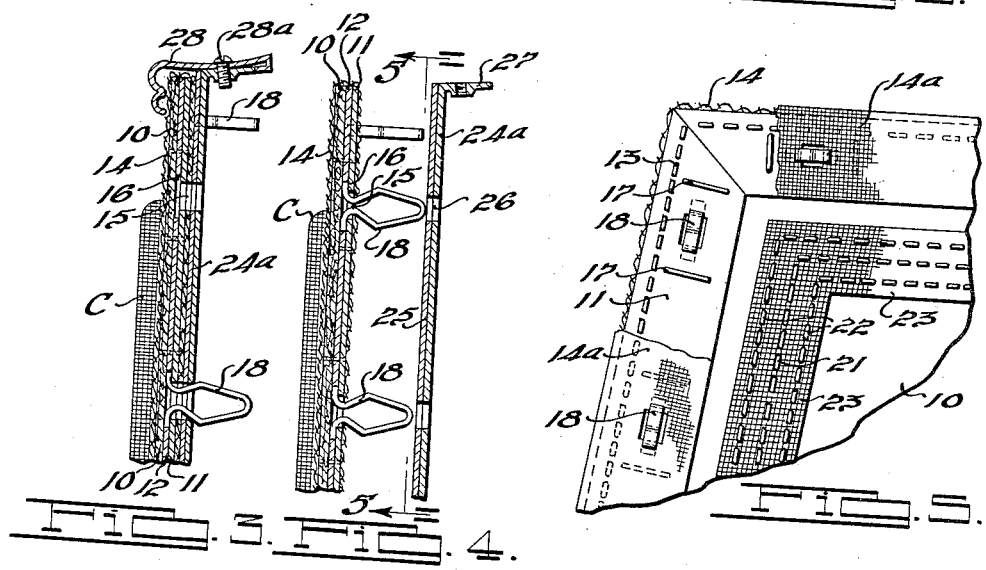
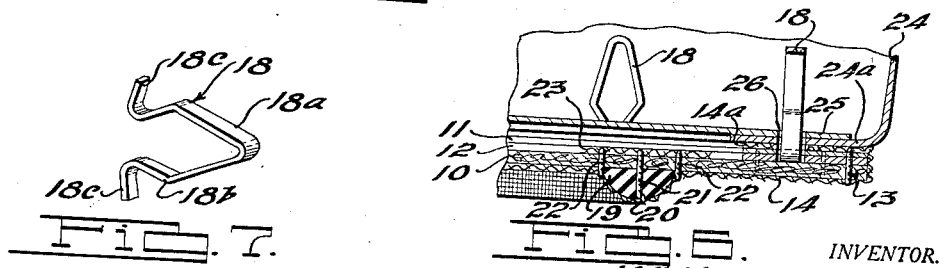
INVENTOR.
William Marshall.
BY
Dike, Calver + Gray
ATTORNEYS.

Patented Nov. 30, 1937

2,100,812

UNITED STATES PATENT OFFICE 2,100,812

TRIM PANEL ASSEMBLY

William Marshall, Detroit, Mich., assignor to Briggs Manufacturing Company, Detroit, Mich., a corporation of Michigan Original application September 29, 1933, Serial No. 691,441, now Patent No. 2,026,585, dated January 7, 1936. Divided and this application October 28, 1935, Serial No. 47,025

4 Claims. (Cl. 45—138)

This invention relates to improvements in trim panel assemblies for vehicle bodies and particularly for automobile bodies, an object of the invention being to improve and simplify the construction of the trim panels while at the same time enabling the panels to be readily and easily assembled on the body frame.

A further object of the invention is to provide an improved trim assembly for vehicle bodies, particularly automobile bodies, in which fastener elements preferably of the spring type are mounted on and carried by the panel in an improved manner whereby manufacturing economies are obtained while at the same time efficiency in production is secured.

A further object of the invention is to provide an improved trim panel assembly for vehicle bodies, particularly automobile bodies, having improved means for the surface ornamentation for such panels and also having improved means for mounting fastener devices therein.

Other objects of this invention will appear in the following description and appended claims, reference being had to the accompanying drawing forming a part of this specification wherein like reference characters designate corresponding parts in the several views.

This application is a division of my co-pending application Serial No. 691,441, filed September 29, 1933, now Patent No. 2,026,585, patented January 7, 1936.

Fig. 1 is a fragmentary perspective view partly broken away of a door of an automobile embodying my invention;

Fig. 2 is a perspective view of the back of a trim panel embodying my invention adapted to be fastened to the door;

Fig. 3 is a section taken through lines 3—3 of Fig. 1 in the direction of the arrows;

Fig. 4 is a section similar to Fig. 3 but illustrating certain of the parts preparatory to the assembly thereof;

Fig. 5 is a fragmentary elevation taken on the lines 5—5 of Fig. 4 in the direction of the arrows;

Fig. 6 is a detail section taken through lines 6—6 of Fig. 1 in the direction of the arrows; and Fig. 7 is a perspective view of a spring fastener member.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The present invention provides an improved trim panel assembly particularly applicable to automobile bodies wherein the fabric covered trim panel and the door or other frame portion of the body are provided with improved cooperating fastener portions so constructed that the trim panel may be readily and easily mounted on the body or door framework and detachably held in position thereon.

Referring to the embodiment of the invention illustrated in the drawing, the trim panel A in this instance comprises a foundation or backing sheet 10 (Fig. 2) preferably of fiber board or the like, which is covered with the trim fabric 14 secured to the backing sheet 10 preferably by cementing or otherwise bonding the trim fabric 14 on the turned portion 14a shown in Fig. 2.

In forming the trim panel the foundation or backing sheets 10 are preferably cut to size. A reinforcing edge member 11 having therein a fastener opening 15, and a spacing element 12 having therein an under-cut fastener opening 16 registering in part with the opening 15 in the member 11 are secured to the foundation or backing sheet 10 by stitches 13 and staples 17, or any other preferred means. The openings or apertures 16 in the member 12 are thus of a size to provide under-cut spaces of sufficient depth to anchor the ends of the spring fastener elements 18, and the openings 15 in the member 11 being somewhat smaller than the openings 16 in the member 12, serve to retain the spring fastener elements 18 in the underlying recesses provided by the openings 16.

On the face of the foundation or backing sheet 10, preferably around the side thereof an ornamental riser 19 formed of rubber or other suitable material is secured by stitches 21 or other suitable means. The ornamental riser 19 may be placed on the face of the panel 10 in any desired form, such for example as the form shown in Fig. 1 where it forms an ornamental surface molding having an outer convex or curvilinear contour. A longitudinal groove or channel 20 is provided in the face of the ornamental riser 19 and is of sufficient depth to permit the stitches 21 or other securing means to extend through the riser 19 and the backing sheet 10 without projecting above the top surface of the riser 19.

After the backing or foundation sheet 10 has been thus assembled the trim fabric 14 is stretched over the face of the panel and is secured along each side of the ornamental riser 19 in stretched condition by parallel lines of stitching 22 or other suitable securing means, thus conforming to the bead-like contour of the risers as indicated at C in Fig. 1. The fabric 14 is turned over the edge of the panel as at 14a and is cemented or otherwise secured to the reenforcing edge member 11. In order to anchor the ornamental riser 19 and the stitches 22 or other suitable means used for securing the fabric 14 to the face of the trim panel, a strip of suitable reenforcing material 23, preferably fabric, is placed on the back of the foundation or backing sheet 10 and the stitches 21 pass through the riser 19 and through the backing sheet 10 and the reenforcing means 23. The stitches 22 also pass through the fabric cover 14, the backing strip 10 and the reenforcing strip 23. In this manner the ornamental riser 19 is anchored securely to the foundation or backing strip 10 and provision is thus made to prevent the pulling out of the stitches 22 used in fastening the fabric 14 on each side of the ornamental riser 19.

The trim panel assembly is secured to the frame of the door or other part of the body by means of the spring fastening elements 18 which, as shown in Fig. 9, are formed with a tapered spring bow portion 18a, a neck portion 18b, and anchoring end portions 18c. After the trim panel has been assembled as above described, the spring fastening elements 18 are compressed and the ends 18c are drawn together and threaded or laced through the openings 15 and into the underlying recessed portions 16. Upon release of the pressure on the member 18 the member is securely held in place in the trim panel as above described.

One use of a trim panel embodying my invention is as a finishing panel on a conventional type of door assembly which includes side pillars 24 having inturned flange portions 24a joined by means of the usual inner metal panel 25. The overlapped portions of the pillar flanges 24a and panel 25 (see Fig. 6) are provided with a plurality of openings 26 so placed relative to the trim panel assembly as to register with the spring fastener elements 18 and thereby permit the latter to be inserted through the openings 26 and so detachably secure the panel on the door, this being shown clearly in Fig. 3 and the relation of the parts prior to assembly being shown in Fig. 4.

As illustrated in Figs. 3 and 4 the upper edge of the inner metal door panel 25 may be provided with a flange 27 for supporting the usual garnish or finish molding 28 secured thereto as by screws 28a.

It will be seen that in the present preferred construction utilizing a non-metallic backing sheet, the staples 17 are located closely adjacent the opposite ends of apertures 15 and of the underlying recesses of the apertures 16, the ends of the staples being embedded and clinched in the backing sheet 10. As a consequence of this construction the retaining walls of the underlying recesses will be stiffened so as to effectively resist detachment of the fasteners.

I claim:

1. A trim panel for a vehicle body comprising a relatively stiff foundation sheet adapted to be covered at the outer face thereof with a finish material, a reinforcing strip secured along the edge of said sheet at the rear face thereof, a spacer strip interposed between said reinforcing strip and foundation sheet, said strips having alined apertures, the aperture in the spacer together with adjacent portions of the reinforcing strip and said foundation sheet forming undercut recesses adapted to detachably receive parts of a fastener device.

2. A trim panel for a vehicle body comprising a relatively stiff foundation sheet adapted to be covered at the outer face thereof with a finish material, a reinforcing strip secured along the edge of said sheet at the rear face thereof, a spacer strip interposed between said reinforcing strip and foundation sheet, said strips having alined apertures, the aperture in the spacer together with adjacent portions of the reinforcing strip and said foundation sheet forming undercut recesses, the bottom of said recesses being formed by said foundation sheet to provide a relatively rigid support for a detachable fastener device when held in said recesses.

3. A trim panel for a vehicle body or the like, comprising a relatively stiff non-metallic foundation sheet adapted to be covered at the outer face thereof with a finish material, a backing strip secured along the edge of said sheet at the rear face thereof, a spacer strip interposed between said backing strip and foundation sheet, said strips having alined apertures therethrough, the aperture in the spacer strip being larger to form a recess underlying the edge of the aperture in the backing strip and the bottom of said recess being formed by said foundation sheet to provide a relatively rigid support for a fastener device when held in said recess.

4. A trim panel for a vehicle body or the like, comprising a relatively stiff non-metallic foundation sheet adapted to be covered at the outer face thereof with a finish material, a backing strip secured along the edge of said sheet at the rear face thereof, a spacer strip interposed between said backing strip and foundation sheet, said strips having alined apertures therethrough, the aperture in the spacer strip being larger to form a recess underlying the edge of the aperture in the backing strip and the bottom of said recess being formed by said foundation sheet to provide a relatively rigid support for a fastener device when held in said recess, and metallic stapling devices securing said strips and foundation sheet together adjacent opposite ends of said apertures.

WILLIAM MARSHALL.